United States Patent Office 3,021,233
Patented Feb. 13, 1962

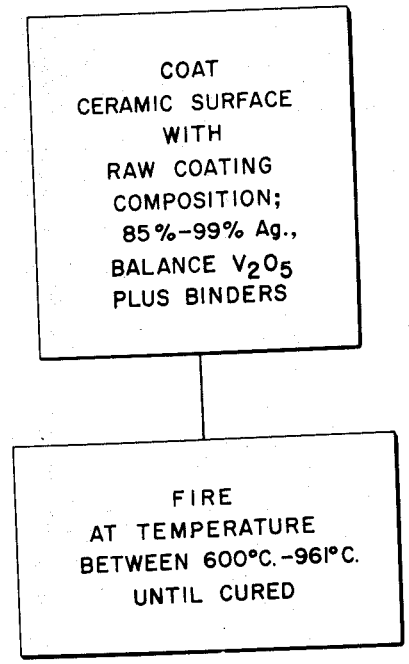
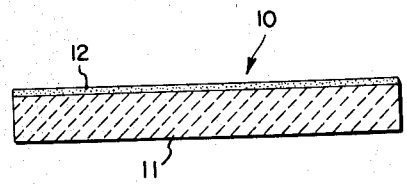
Fig-1
Fig-2

3,021,233
METHOD OF APPLYING AN ELECTRICALLY CONDUCTIVE CONTACT MATERIAL AND RESULTING COATED ARTICLE
Robert D. Fenity, Hopkins, Minn., assignor to Minneapolis-Honeywell Regulator Company, Minneapolis, Minn., a corporation of Delaware
Filed May 22, 1959, Ser. No. 815,095
5 Claims. (Cl. 117—227)

The present invention is concerned with the preparation of an improved highly adherent electrically conductive coating arranged on the surface of a material such as a polycrystalline ceramic material or other refractory substance. More specifically, the invention relates to a particular coating composition arranged to be applied to the surface of such a body, the composition including essentially from about 85% up to about 99% of silver, the balance vanadium pentoxide.

According to the present invention, the conductive coating composition is blended with a suitable vehicle such as polystyrene and xylene in order to make a paintable mixture. If desired, a binder material such as ethyl cellulose together with a fast and a slow drying solvent such as butyl acetate and ethyl Cellosolve may be employed in place of the polystyrene-xylene mixture. After the surface of the body has been coated with this raw coating composition, it is fired in a suitable enclosure at a temperature which ranges substantially between 600° C. and 961° C. The elevated temperature is maintained until the coating has become substantially fused, cured or matured. This type of electrode or conductive coating has been found to be highly desirable for use in preparing contacts to n-type oxide semiconductors such as the doped iron oxide type, the coating being highly adherent and mechanically stable as well as being substantially cohesive in its contact with the polycrystalline oxide material.

It is therefore an object of the present invention to prepare improved electrically conductive surface coatings for polycrystalline oxide ceramic bodies.

It is a further object of the present invention to prepare improved highly adherent electrically conductive coatings consisting essentially of from 85%–99% silver, balance vanadium pentoxide, these compositions being particularly adapted for preparing electrically conductive coatings on doped iron oxide semiconductors.

Other and further objects of the present invention will become apparent upon a study of the following specification, appended claims, and accompanying drawing wherein:

FIGURE 1 is a flow diagram representing the preferred method of carrying out the present invention, and FIGURE 2 is a sectional view of a polycrystalline oxide ceramic material having an electrically conductive coating shown thereon.

According to the preferred modification of the present invention, a mixture including 95% silver, balance $V_2O_5$ is prepared. This mixture is then blended with a vehicle including 20% polystyrene and 80% xylene. The silver-vanadium pentoxide composition is then blended with the vehicle and a paintable mixture prepared. A polycrystalline ceramic body is then selected, such as an iron oxide-titanium dioxide semiconductor, the mixture being applied as a paint to the desired surface area. The vehicle is sufficiently viscous to maintain the composition in relatively well defined areas and there is consequently little if any, danger of the material spreading to other undesired areas. The body is then fired at a temperature of about 750° C. for a period of 30 minutes, this being sufficient to adequately cure or mature the mixture. The body is then permitted to cool down and is then in a form suitable for application of conductive leads such as wires or the like by any suitable means such as soldering or the like. Solder compositions of 50% Pb and 50% Sn have been found particularly suitable for soldering leads to the fired conductive coating.

The composition which is set forth as being between 85 and 99% silver, balance vanadium pentoxide is critical to the invention. If the composition includes less than 85% silver, the film becomes resistive in nature and hence is not particularly desirable as an electrically conductive film. If the mixture does not contain at least 1% of vanadium pentoxide, the silver is not bound or retained in the electrode material as well as it is when the composition is prepared with at least 1% of vanadium pentoxide. The temperature curing cycle is likewise critical, the 600° C. being required for uniform flow and also to promote the adherence of the layer to the ceramic body. If the temperature of 961° C. is exceeded, the silver tends to form an undesirable crystalline structure on the surface of the body and accordingly loses its desirable electrically conductive characteristic.

The vehicle which is utilized in connection with the coating composition is not critical to its application. It is desirable, of course, that a vehicle be prepared which is compatible with the firing techniques, such as firing in air or the like, and which is likewise sufficiently volatile at the firing temperature utilized to be substantially lost to the composition or film coating.

It will be understood, of course, that the various examples given herein, are set forth for purposes of illustration only, and are accordingly not to be taken as a limitation on the scope to which the invention is reasonably entitled.

I claim as my invention:
1. The method of preparing electrically conductive film on a surface of a refractory body, said method including applying to the surface of said body a coating composition consisting of from about 85% up to about 99% of silver, balance vanadium pentoxide, firing said coated body at a temperature ranging from between 600° C. and 961° C. for a period sufficient to mature said film.

2. The method of preparing an electrical connection to the surface of a polycrystalline oxide ceramic body, said method consisting of applying to the surface of said body a coating composition consisting of from about 85% up to about 99% of silver, balance vanadium pentoxide, firing said coated body at a temperature ranging from between 600° C. and 961° C. for a period sufficient to mature said film.

3. An article comprising a refractory body having thereon in an adherent relationship an electrically conductive coating consisting essentially of a mixture of from about 85 percent up to about 99 percent of silver, balance vanadium pentoxide.

4. An article comprising a poly-crystalline oxide ceramic body having thereon in an adherent relationship an electrically conductive film consisting essentially of a fired layer of from about 85 percent up to about 99 percent of silver, balance vanadium pentoxide.

5. An article comprising a doped N-type iron oxide semi-conductor having thereon in an adherent relationship an electrically conductive electrode consisting essentially of a fired layer of from 85 percent to about 99 percent silver, balance vanadium pentoxide.

References Cited in the file of this patent
UNITED STATES PATENTS
2,247,036    Ruben _____ June 24, 1941
FOREIGN PATENTS
794,579    Great Britain _____ May 7, 1958